United States Patent

[11] 3,570,572

| [72] | Inventors | Armando Cardenas<br>Cuyahoga Falls;<br>Ronald L. Simpson, Akron, Ohio |
|---|---|---|
| [21] | Appl. No. | 786,117 |
| [22] | Filed | Dec. 23, 1968 |
| [45] | Patented | Mar. 16, 1971 |
| [73] | Assignee | The B. F. Goodrich Company<br>New York, N.Y. |

[54] COLLAPSIBLE TIRE
8 Claims, 8 Drawing Figs.

[52] U.S. Cl. ................................................ 152/352, 152/330
[51] Int. Cl. ........................................................ B60c 13/00, B60c 19/00, B60c 5/00
[50] Field of Search .......................................... 152/352, 330

[56] References Cited
UNITED STATES PATENTS

| 3,394,751 | 7/1968 | Sidles et al. | 152/330 |
| 3,400,746 | 9/1968 | Heimovics, Jr. | 152/352 |

*Primary Examiner*—Arthur L. La Point
*Assistant Examiner*—Richard A. Bertsch
*Attorneys*—Joseph Januszkiewicz and W. A. Shira, Jr

ABSTRACT: A pneumatic tire which in the inflated condition has a conventional toroidal shape but while in deflated condition assumes a shape wherein the respective sidewall portions are axially folded inwardly to decrease the overall dimensions of the collapsed tire. The axial folds define a double curvilinear fold to permit maximum collapse without interfering with adjacent fold sections.

Patented March 16, 1971

INVENTORS
ARMANDO CARDENAS
RONALD L. SIMPSON
BY Joseph Januszkiewicz
ATTY.

INVENTORS
ARMANDO CARDENAS
RONALD L. SIMPSON
BY
ATTY.

COLLAPSIBLE TIRE

BACKGROUND OF THE INVENTION

This invention relates to a pneumatic tire and more particularly to an improved expansible type pneumatic tire with permanently set folds in the sidewall region, which tire in the inflated condition is a conventionally shaped toroidal tire while in the uninflated condition has axially inwardly extending flexible folds set in the sidewall regions of the carcass with the external diameter and overall lateral width of the tire being much smaller when deflated.

It is the conventional practice to build tires on a generally cylindrical drum by wrapping successive layers of rubberized fabric around the drum, applying bead rings on the rubberized fabric or ply stock at the shoulders of the drum; turning up the plies around the bead rings; applying the sidewalls and the tread portions to the tire carcass and thence form the tire carcass into a toroidal form which is permanently shaped and set in form. More recently, in order to conserve space, it has been proposed to make flexible folds which are permanently set in the sidewall region of a tire carcass such that when the tire is deflated it may have its outside diameter as measured at the crown of the tread in the order of 30 to 40 percent smaller when the tire is deflated than when it is inflated. Similarly, the lateral width of the tire may be approximately 10 percent smaller when deflated than when inflated. The total space occupied by a tire and wheel assembly when using such tire is about 50 percent smaller when a tire is deflated than when the tire is inflated. Such tires have been used principally for passenger use and proposed for aircraft service; however, there is a need for the use of such tires in all forms of vehicular transportation. There has been limitations in the manufacture of such tires, particularly in large size tires such as for trucks, since the amount of collapse of the sidewall regions necessarily limited their application to large size tires because the respective sidewall portions would interfere with the collapse of a large size tire.

SUMMARY OF THE INVENTION

The present invention provides a novel expansible tire that is usable for trucks and any other type of vehicular use which in its uninflated condition is more compact and takes up relatively a small amount of storage space in comparison to the conventional tire. Its load carrying capacity is such as to assure safe performance and is applicable to all types of tires including truck tires. Such tire additionally provides sufficient load carrying capacity even when in the uninflated condition whereby the operator can travel to a repair shop or a service station to permit repair during such uninflated condition of the tire.

The expansible tire in the uninflated condition comprises a tire carcass having a conventional tread portion with its opposing sidewall portions extending in annular reentrant folds directly axially toward each other in an arcuately shaped manner to prevent overlapping or or interference of the respective fold portions while in the inflated condition assumes a conventional toroidal shape.

The invention will be further explained with reference to the accompanying drawings which show the preferred forms of the tire made according to and embodying this invention.

DESCRIPTION OF THE PREFERRED EMBODIMENTS

Figure 1:
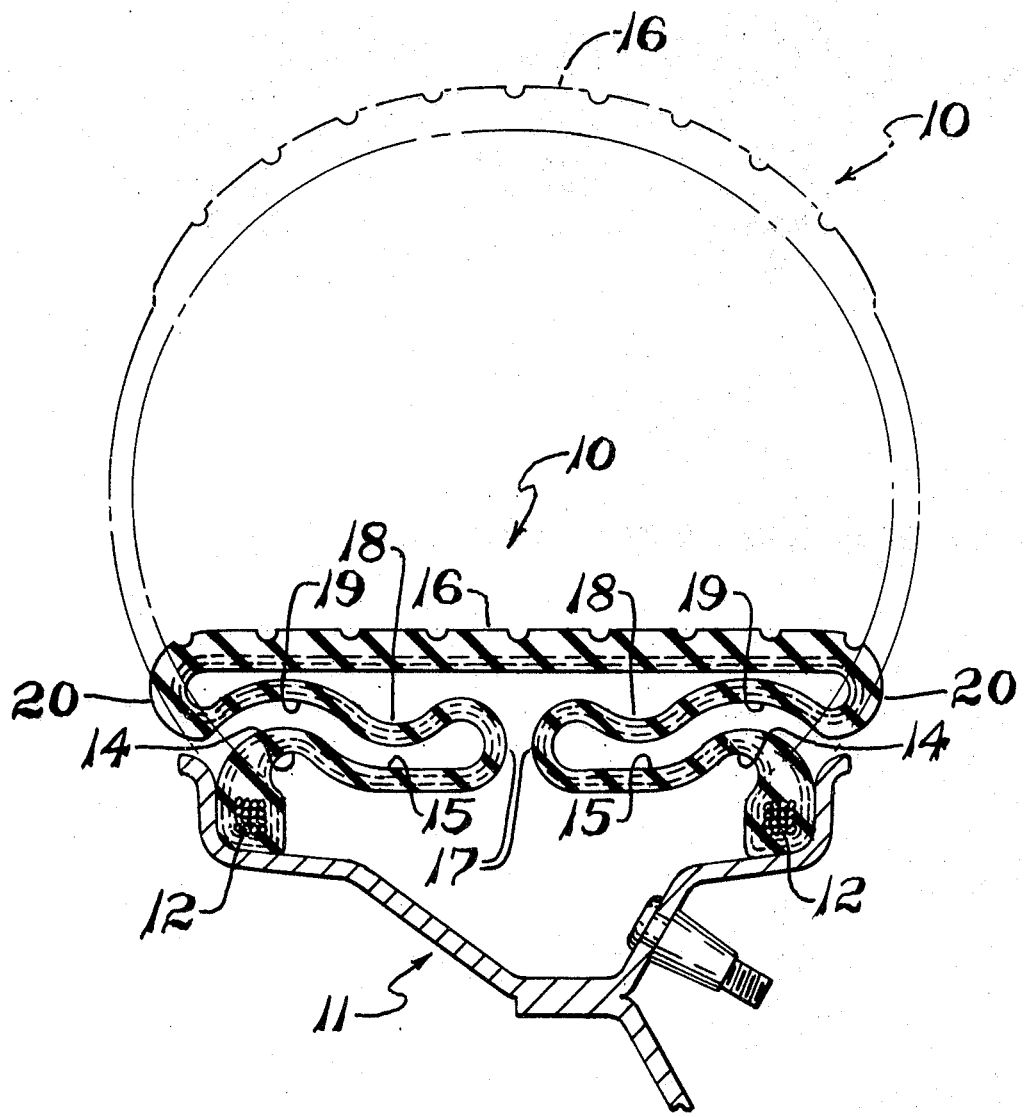
FIG. 1 shows a cross section through a tire and wheel rim assembly with the tire collapsed and folded in the uninflated form and showing the inflated cross-sectional form of the tire in dotted lines.

Referring to the drawings and more particularly to FIG. 1, the formed tire 10 is mounted on a standard drop center type automotive rim 11. Tire 10 has a pair of annularly laterally spaced inextensible beads 12 with a flexible carcass extending therebetween and fastened to each of the beads. The carcass includes two fabric plies designated by the dotted lines and an external ground engaging tread portion 16. The components of the tire as referred to above are made of conventional surface-proven tire making material and the beads 12 are made of wire wound grommets with the plies fastened to the beads 12 in accordance with the common industry practice for building a pneumatic tire. The plies are preferably conventional tire cord fabric (wefted or weftless) such as nylon, rayon or special polyester cords. The elastomeric coating on the fabric is in a similar manner conventional tire making rubber compounds as is the tread portion 16.

The sidewalls of the tire, as extending from the beads 12, form a concave downward portion 14, followed by a concave upward portion 15 and a bight portion 17 followed by a concave upward portion 18 and thence a concave downward portion 19 which terminates into a bight portion 20 which merges with the tread portion 16. The tread 16 adjacent to the respective bight portions 20 will be referred to as tread edges which would be a circumferentially extending annular edge.

Figure 2:
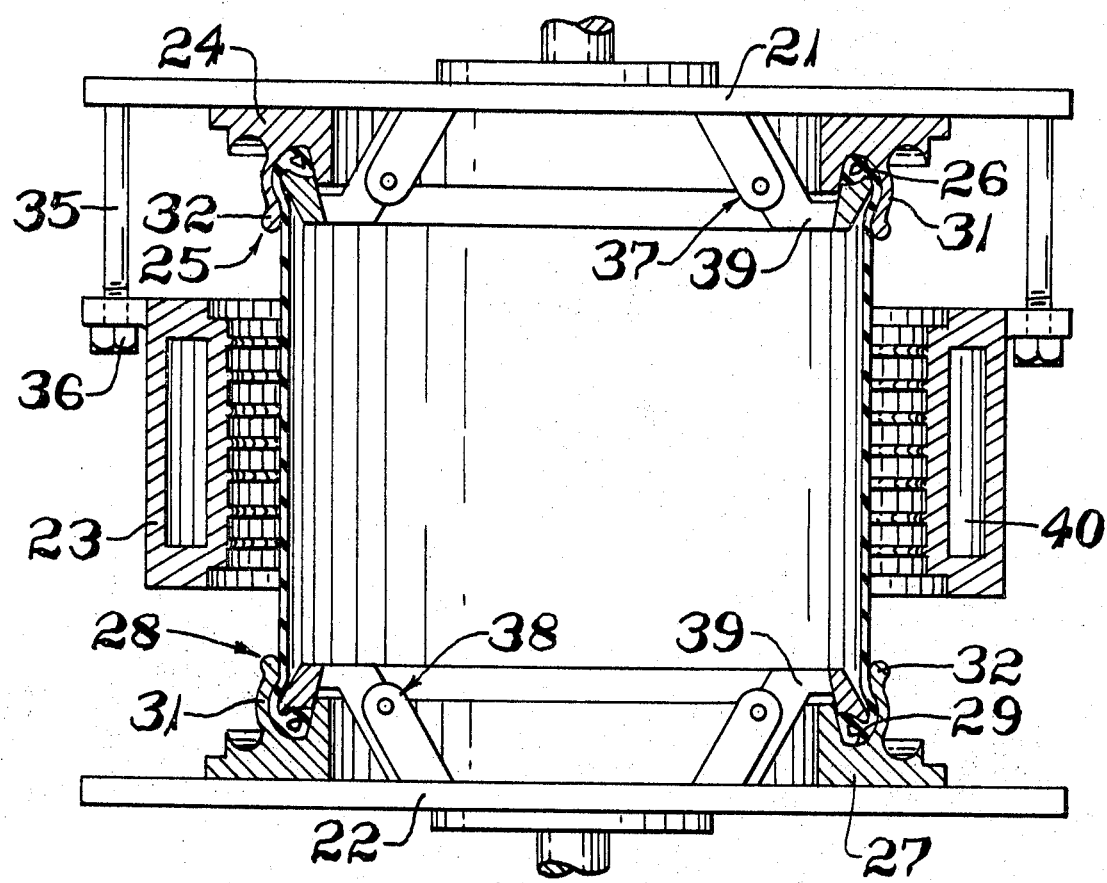
FIG. 2 is a schematic cross-sectional view of the green tire prior to shaping where the green tire is held in the open mold apparatus.
Figure 3:
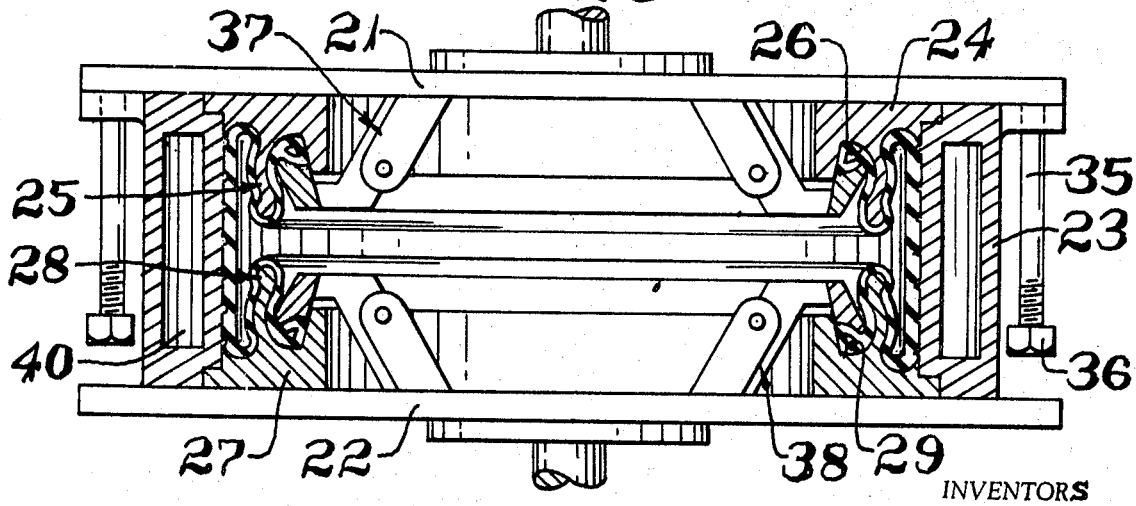
FIG. 3 is a schematic cross-sectional view similar to FIG. 2 but showing the curing apparatus fully closed and green tire fully shaped therein.

The apparatus for shaping and forming such tire is shown in FIGS. 2 and 3 as a curing apparatus which includes an upper end mold section 21, a lower end mold section 22, and an intermediate mold section 23. Upper end mold section 21 has a bead-engaging ring 24, an annular rigid folding ring 25 and an annular bead seat 26. The lower mold section 22 is axially aligned with the upper mold section 21 and similarly includes a bead engaging ring 27, an annular rigid folding ring 28, and an annular bead seat 29.

The annular rigid folding rings 25 and 28 are similar in construction and shape and therefore only one of these rings will be described. Ring 28 as viewed in FIG. 4 has a curvilinear portion 31 that is concave downward and a forwardly disposed portion 32 that is concave upward, such that portions 31 and 32 form a curvilinearly projection which molds a curvilinear fold (14, 15, 18 and 19) into the sidewall portion of a tire. For the purposes of description such configuration of the annular ring resembles an S curve configuration in cross section which molds folds into the sidewalls of a tire which are of a double curvilinear fold (see FIG. 1).

The intermediate mold section 23 rests on the lower end portion of a plurality of vertically depending threaded guide rods 35 which have nuts 36 secured thereto to maintain a fixed relationship between the intermediate mold section and the upper mold section 21 and the lower mold section 22. The nuts 36 on the guide rods 35 are adjustably mounted to accommodate different size intermediate mold sections and locate such intermediate section 23 relative to the upper mold section 21. The intermediate mold section 23 has a circumferential pattern which is a negative impression for molding a tread pattern on a tire. The lower and upper mold sections 21 and 22 operate in cooperation with the intermediate mold section 23 when brought together in mating engagement to define therebetween a cavity of a tire with the lower and upper mold sections having the annular folding rings 25 and 28 extending axially along the sidewall portions of the mold to provide axially folded sidewall portions on the molded tire as shown in FIG. 1 and described above. The upper and lower mold sections 21 and 22 have associated therewith bead shaping and pressing assemblies 37 and 38 which are adapted to clamp, shape and compress the respective beads of the pulley band tire T that is adapted to be positioned in an upright position on the annular bead seat 29 of the lower mold section 22 when the press is open which in the illustration depicted in FIG. 2 is such that the upper mold section 21 is in the extreme upper mold position relative to the lower mold section 22 to facilitate the placing of the tire band T into the mold relative to the lower mold section 22 without interference. The pressing assemblies 37 and 38 are identical, each comprising a collapsible rim made up of alternate short and long segments 39 having beveled ends. A detailed description of the operation of the bead shaping and pressing assembly is fully described in U. S. Pat. No. 3,153,263. For purposes of the present invention, it is sufficient to note that the pressing assemblies 37 and 38 operate to selectively clamp via the arcuate segments 39 the bead portion of a green tire T in cooperation with the annular rings 25 and 28. When the bead shaping and pressing assemblies 37 and 38 are in their collapsed position, its circumferential peripheral dimension is reduced to facilitate the placement of the green tire T onto the lower mold plate 22 without interference.

Figure 8:
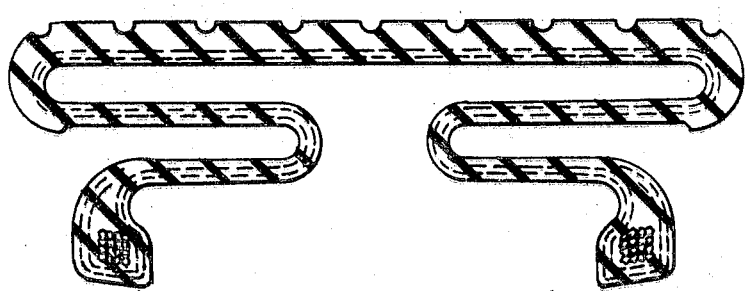
FIG. 8 is a cross-sectional view of a portion of a collapsed tire showing the linearly axial folded sidewalls as molded by the annular ring shown in FIG. 6.

With the placement of the tire T onto the mold, and with the bead shaping and pressing assemblies 37 and 38 in clamping position the tire T is in the position as shown in FIG. 2 with the center line of the intermediate mold section 23 located midway between the respective end portions of the green tire T. As pressurized air is introduced into the chamber formed by the green tire T and the respective end mold plates 21 and 22, the chamber causes a swelling out of the central portion of the tire T such that the tread portion abuttingly engages the intermediate mold section 23. The upper and lower mold sections 21 and 22 are then axially moved toward each other to exert predetermined pressing and shaping pressures on the respective tire beads as is known in the art. Since the intermediate section of the tire is in abutting engagement with the tread of the tire carcass, such intermediate section is free to maintain alignment of the central portion of the tire during the shaping operation. As the respective upper and lower mold sections move toward each other, the sidewall portions of the tire body begin to overlap the annular rings 25 and 28 such that continued movement of the upper and lower mold plates 21 and 22 fold the sidewalls of the tire T axially U.S. respective annular rings until the respective end mold sections 21 and 22 are in complementary engagement with the intermediate mold section 23 as shown in FIG. 3. Curing medium under pressure is then circulated through the chamber defined by the tire carcass and the upper and lower mold sections 21 and 22 as well as in the annular bore 40 in the intermediate mold section 23 to effect curing to the final shape. The curing medium and the condensate are then removed prior to the separation of the mold sections 21 and 22 and the collapse of the respective bead clamping and pressing assemblies 37 and 38. The folded regions of the sidewalls during the curing operation do not touch the surrounding interior surfaces of the tread, nor do the bight portions 17 of the sidewall touch each other but as depicted by FIG. 1 are relatively close to each other. The sidewall double curvilinear fold provides a tire which upon expansion defines a tire whose diameter is considerably larger than the compact structure presented in its deflated condition and is such that if the folded portions were planar as shown in FIG. 8 would prevent molding since the bight portions of the folds would overlap and become integral with each other during vulcanization or molding.

Figure 4:
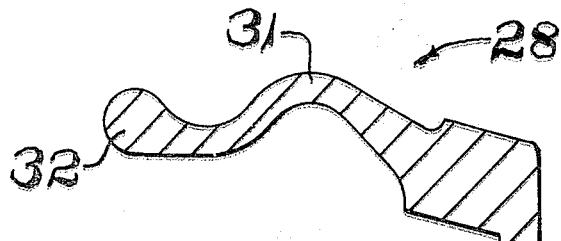
FIG. 4 is an enlarged fragmentary cross-sectional view of a portion of an annular folding ring as used in FIG. 2 to produce a tire as shown in FIG. 1.
Figure 7:
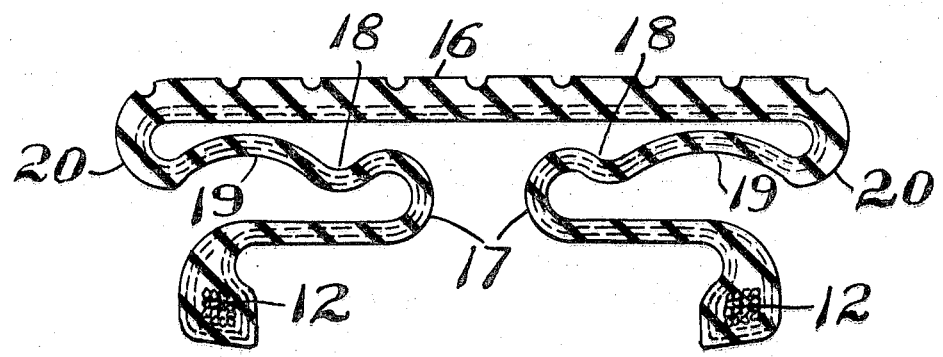
FIG. 7 is a cross-sectional view of a portion of a collapsed tire showing the curvilinear axial folded sidewalls as molded by the annular ring shown in FIG. 5.
Figure 5:
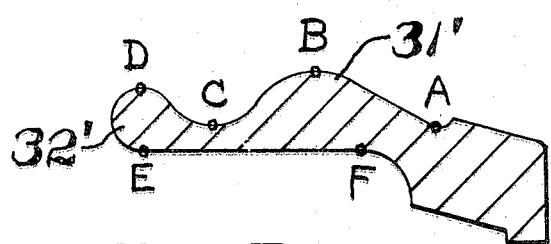
FIG. 5 is an enlarged fragmentary cross-sectional view of a modified form of a portion of an annular folding ring.
Figure 6:
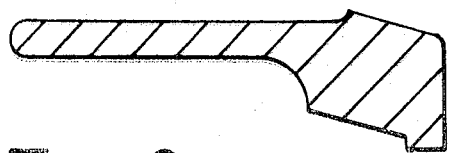
FIG. 6 is an enlarged fragmentary cross-sectional view of another form of a portion of an annular folding ring which molds linear axial folds into the sidewall of a tire.

A modification of the annular rigid folding ring 25 and 28 is shown in FIG. 5 which is similar to that shown in FIG. 4 as comprising a base portion 31' and a forward portion 32' such that the base portion 31' as viewed in FIG. 5 has an upper curvilinear portion that extends from A through C and a lower linear portion that extends from F towards E while the forward portion 32' has a curvilinear portion that extends from C through E and a lower linear portion that extends from E towards F. The axial folds molded by such an annular projection as shown in FIG. 5 would be to give a tire having a cross section generally as shown in FIG. 7 except that the bight portions would be closer to each other but for clarity are shown widely spaced. Upon inflation of the molded tire as shown in FIG. 7 the tire would have a conventional toroidal shape as shown in dotted lines in FIG. 1. By having a mold with annular projections 25 and 28 of the shape as shown in FIG. 6 a tire would be molded having a cross secton as shown in FIG. 8. As an example of the result achieved by using such projections to mold annular folds into the sidewalls of a tire, using a mold having annular projections 25 and 28 of the shape shown in FIG. 6 could yield a tire that upon inflation would be of a size commonly referred to as 8.25–14. Using the same mold; however, having annular projections 25 and 28 of the shape shown in FIG. 5 would yield a tire upon inflation that would be of a size referred to as 8.45–14. Using the same mold; however, having annular projections 25 and 28 of the shape shown in FIG. 4 would yield a tire having a cross-sectional configuration of that similar to FIG. 1 which upon inflation would be of a size referred to in the art as 8.85–14. Thus with the described invention one is able to provide a tire that in the collapsed condition requires a minimum amount of storage space heretofore not possible. In addition, one is able to use the same mold with variations in the annular projection to mold different size tires.

Various modifications are contemplated and may be resorted to by those skilled in the art without departing from the spirit and scope of the invention, as hereinafter defined by the appended claims, as only preferred embodiments thereof have been described.

We claim:

1. A pneumatic tire inflatable to a generally toroidal shape, the tire comprising: a pair of laterally spaced annular beads and an annular flexible carcass of elastomeric coated fabric, said annular carcass having a circumferential extending tread region, said carcass having opposing sidewall portions between said tread region and each of said beads, each sidewall portion having axial folds extending inwardly beneath said tread region and said beads, each of said folds having a bight portion and a continuous curvilinear portion in cross section, and said bight portions of each fold lying closely adjacent to each other.

2. A pneumatic tire as set forth in claim 1 wherein said folded sidewall portions being permanently set folds in said sidewall portions extending circumferentially in a continuous reentrant channel open to the outside surface of the sidewall.

3. A pneumatic tire inflatable to a generally toroidal shape, the tire comprising a pair of laterally spaced annular beads and an annular flexible carcass of elastomeric coated fabric with a circumferentially extending tread region and opposing sidewall portions, each of said sidewall portions having continuous double curvilinear reentrant folded portions in cross section that extend inwardly toward each other.

4. A pneumatic tire as set forth in claim 3 wherein each of said double curvilinear fold portions is S-shaped.

5. A pneumatic tire as set forth in claim 3 wherein each of said curvilinear fold portions is nonlinear in cross section.

6. A pneumatic tire as set forth in claim 4 wherein the bight portion of each curvilinear folded portion lies closely adjacent to each other and beneath the tread portion.

7. A pneumatic tire as set forth in claim 6 wherein said curvilinear fold portions have concave and convex portions.

8. A pneumatic tire inflatable to a generally toroidal shape, the tire comprising a pair of laterally spaced annular beads and an annular flexible carcass of elastomeric coated fabric with a circumferentially extending tread region and opposing sidewall portions, said tread region being a circumferentially extending band integral with said carcass with said band having spaced circumferentially extending edges and a circumferentially extending medial center line that is equidistant from said circumferentially extending edges, each of said sidewall portions having an axially extending folded portion, said folded portions extending inwardly toward each other, each of said folded portions having a bight portion lying closely adjacent each other, each of said folded portions having a first portion and a second portion, said first portion extends from said edge of said tread region to closely adjacent to said bight portion, said second portion extending from said bight portion to one of said annular beads, each of said first portions being continuous curvilinear in cross section, and each of said second portions being linear in cross section.